US012539632B2

(12) United States Patent
Gaelen et al.

(10) Patent No.: US 12,539,632 B2
(45) Date of Patent: Feb. 3, 2026

(54) SAFETY ACCESSORY FOR KNIFES

(71) Applicant: The Cutting Egg, LLC, Union, NJ (US)

(72) Inventors: Marc M. Gaelen, Short Hills, NJ (US); Keegan Schoch, Leechburg, PA (US); John Vassa, Nazareth, PA (US)

( * ) Notice: Subject to any disclaimer, the term of this patent is extended or adjusted under 35 U.S.C. 154(b) by 131 days.

(21) Appl. No.: 18/407,564

(22) Filed: Jan. 9, 2024

(65) Prior Publication Data

US 2024/0227227 A1 Jul. 11, 2024

Related U.S. Application Data

(60) Provisional application No. 63/437,838, filed on Jan. 9, 2023.

(51) Int. Cl.
*B26B 29/02* (2006.01)

(52) U.S. Cl.
CPC .................................... *B26B 29/02* (2013.01)

(58) Field of Classification Search
CPC ...................................................... B26B 29/02
See application file for complete search history.

(56) References Cited

U.S. PATENT DOCUMENTS

| | | | | | |
|---|---|---|---|---|---|
| 4,356,754 | A * | 11/1982 | Fishman | G10H 3/185 84/DIG. 24 |
| D461,681 | S * | 8/2002 | Lothe | D7/649 |
| D514,435 | S * | 2/2006 | Bhavnani | D8/395 |
| 8,418,372 | B1 * | 4/2013 | Risley, Sr. | B25B 27/10 30/294 |
| D684,316 | S * | 6/2013 | Batres | D28/40 |
| 2006/0179665 | A1 * | 8/2006 | Aston, III | B26B 3/00 30/296.1 |
| 2016/0193742 | A1 * | 7/2016 | Faiola | B26B 3/00 30/296.1 |
| 2017/0210021 | A1 * | 7/2017 | Lee | B26B 29/02 |
| 2020/0246992 | A1 * | 8/2020 | Ritter | B26B 29/02 |
| 2023/0111827 | A1 * | 4/2023 | Chen | B26B 29/02 83/13 |
| 2024/0227227 | A1 * | 7/2024 | Gaelen | B26B 29/02 |

* cited by examiner

*Primary Examiner* — Hwei-Siu C Payer
(74) *Attorney, Agent, or Firm* — David L. Nocilly; Bond Schoeneck & King PLLC

(57) ABSTRACT

The invention is that of an ovoid-shaped cutting accessory configured to fit over the spine of a knife to allow its user to provide downward pressure to the spine of the knife to aid in safely cutting through materials of such density that the knife handle alone does not allow the user to safely provide sufficient pressure to cut through the material. The cutting accessory comprises a longitudinal notch traversing the major axis of the accessory and configured to receive a resilient jaw comprising opposing arrays of resilient teeth by press-fitting. The teeth of the opposing arrays may be offset such that each tooth of one array fits between two teeth of the opposing array to provide strong gripping of the spine of the knife. The cutting accessory is designed to provide safety for the user by reducing the possibility that the user's finger may slip and be cut.

14 Claims, 3 Drawing Sheets

SAFETY ACCESSORY FOR KNIFES

CROSS REFERENCE TO RELATED APPLICATIONS

This application claims the benefit of priority of U.S. Provisional Patent App. Ser. No. 63/437,838, filed Jan. 9, 2023, the contents of which are incorporated by reference herein in their entirety.

BACKGROUND OF THE INVENTION

1. Field of the Invention

The present invention relates generally to safety accessories for knives and, in particular, a hand grip for safely pressing down on the spine of a knife blade while cutting.

2. Description of the Background

The spine of a knife is the unsharpened portion of the blade opposite the sharpened edge. The spine is the thickest part of the knife and gives the knife its strength. It is also a convenient place to push down on the knife when cutting into something dense, when the handle alone does not provide sufficient leverage. However, one should never put their finger on the spine of a knife. To do so poses a risk that the finger will slip off underneath the blade. Commercial chefs understand this and tend to use a towel, pressing down on the spine through a towel. However this obscures whatever is being cut. What is needed is a safe and more effective accessory for allowing a user to push down on the spine of a knife when cutting into something too dense for the handle alone.

The present invention is described in greater detail in the detailed description of the invention, and the appended drawings. Additional features and advantages of the invention will be set forth in the description that follows, will be apparent from the description, or may be learned by using the invention.

BRIEF DESCRIPTION OF THE DRAWINGS

Other objects, features, and advantages of the present invention will become more apparent from the following detailed description of the preferred embodiments and certain modifications thereof when taken together with the accompanying drawings.

DETAILED DESCRIPTION OF THE INVENTION

Reference will now be made in detail to preferred embodiments of the present invention, examples of which are illustrated in the accompanying drawings. Wherever possible, the same reference numbers will be used throughout the drawings to refer to the same or similar parts.

Figure 1:
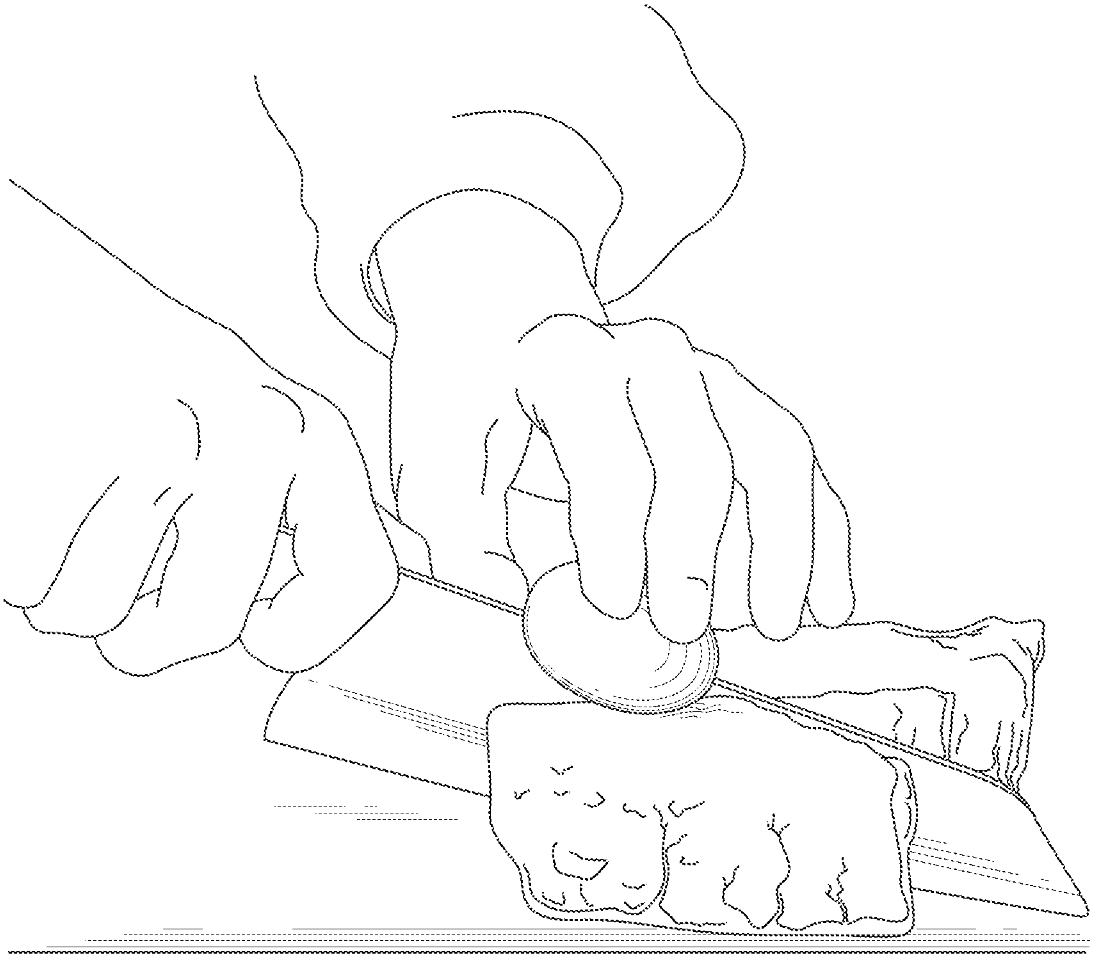
FIG. 1 is a perspective view of a cutting accessory in use according to an embodiment of the invention.
Figure 2:
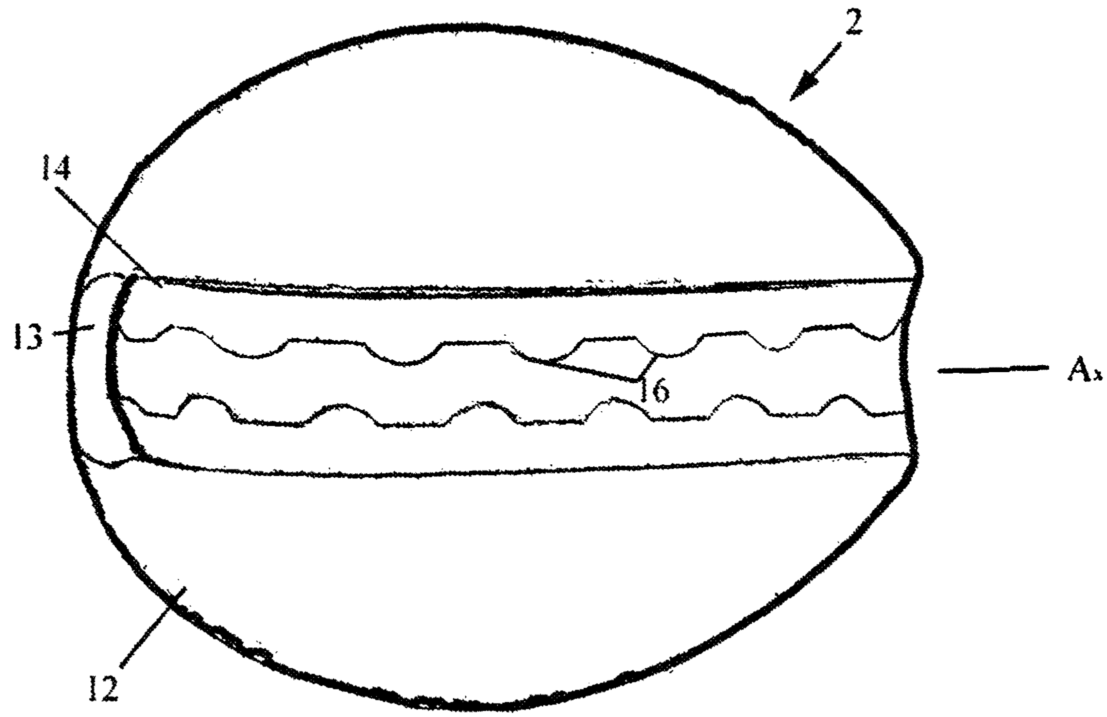
FIG. 2 is a bottom view of the cutting accessory of FIG. 1.
Figure 4:
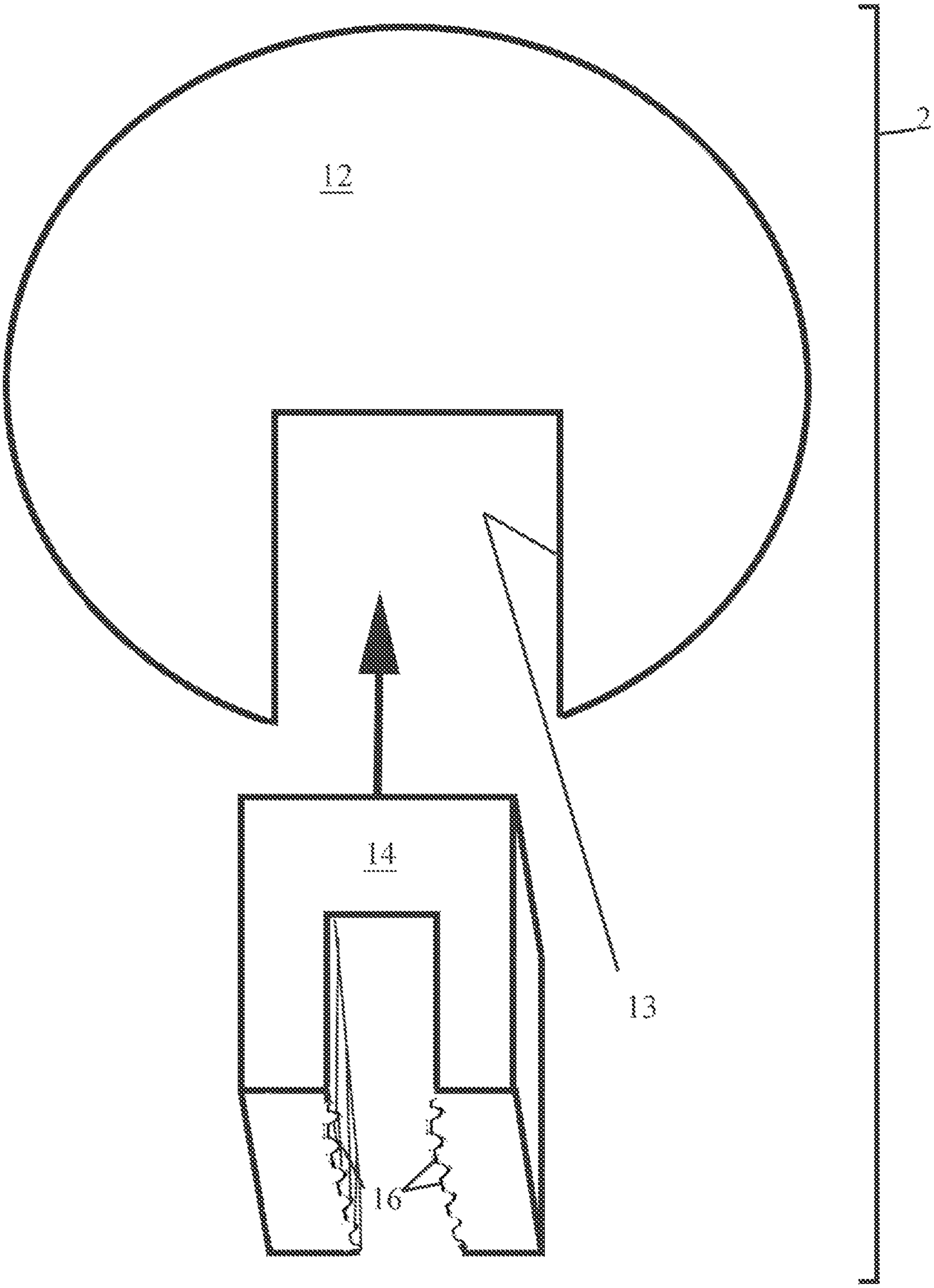
FIG. 4 is an assembly drawing of the cutting accessory of FIGS. 1-3.

As seen in FIG. 1, the present invention is a cutting accessory 2 that provides a safe and effective means for pushing down upon the spine of a knife when cutting into something too dense for the handle alone. The cutting accessory 2 generally comprises an ovoid body 12 presenting a firm and comfortable grip, and a jaw 14 (obscured in FIG. 1) seated within a longitudinal notch in the body 12, as shown in FIGS. 2 and 4. The jaw 14 is preferably fabricated from silicon rubber, although one of ordinary skill in the art will appreciate that other materials having an adequate coefficient of friction for use may be selected as equivalents for fabrication of the jaw 14.

FIG. 2 is a bottom view of the cutting accessory of FIG. 1 showing the notch 13 and jaw 14 from bottom view configured to fit over the spine of a knife. The notch 13 traverses the body 12 along its major axis and presents an open-faced rectilinear recess opening radially outward from the body 12 and extending inward at least to the longitudinal axis Ax. The width of the notch is preferably within a range of from ⅓-⅔ inches, and the depth of the notch 13 varies with the curvature of the body 12.

The jaw 14 partially traverses the notch 13 and is rectilinear on three sides for press-fitting inside notch 13. The jaw 14 presents two opposing parallel arrays of resilient teeth 16 spaced apart by a recess. The teeth 16 on one array of jaw 14 are offset from the teeth of the other array of jaw 14 such that each tooth 16 protrudes between two opposing teeth 16. This increases the resiliency of the teeth 16 and accommodates a wider range of sizes of knife spines, plus it increases the grip of the teeth 16 on the knife spine.

Figure 3:
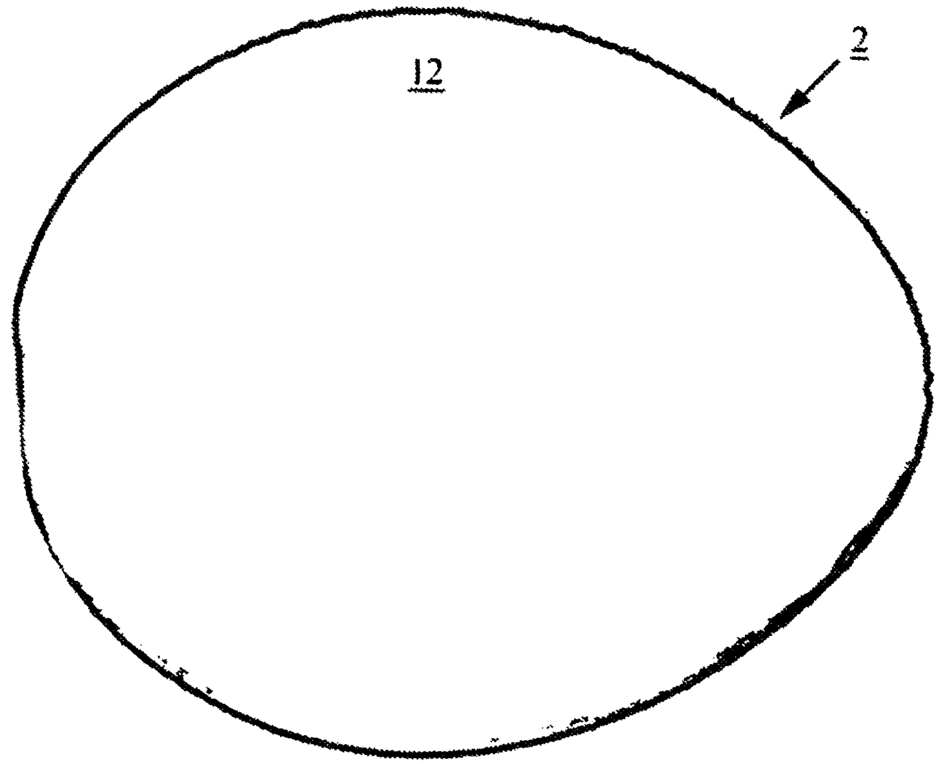
FIG. 3 is a top view of the cutting accessory of FIGS. 1-2.

As seen in FIG. 3 the body 12 is most preferably ovoid-shaped to optimize the variety of grips used upon it, e.g., two-finger, to full-hand grip to open palm. In all such cases the ovoid shape presents a firm, comfortable and safe gripping surface.

In use, the cutting accessory 2 is pushed down onto the spine of the knife, which slides up between the teeth 16 of the jaw 14 in a compression fit. The combination of the compression and high friction coefficient of the silicon rubber teeth 16 and jaw 14 securely locks the cutting accessory onto the spine and prevents sliding accidents. Referring to FIG. 1, the user simply pushes down on the cutting accessory to increase blade pressure.

FIG. 4 is an assembly drawing of the cutting accessory of FIGS. 1-3 illustrating how the resilient silicon rubber jaw 14 is press-fit into the notch 13. The length of the rubber jaw 14 is slightly less than that of the notch 13, yet the rectilinear outer walls of the rubber jaw 14 are very slightly larger than the walls of the notch 13, such that the rubber jaw 14 must be compacted slightly to fit and this occurs when press-fit into the notch 13. As above, the combination of the compression and high friction coefficient of the material selected for fabrication of the jaw 14, preferably silicon rubber, securely retains the jaw 14 within the body 12 of the cutting accessory. The net result is a safer and more effective solution for pushing down on the spine of a knife when cutting into something dense.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. An apparatus for applying downward pressure to a spine of a knife blade, comprising:

an ovoid body having a longitudinal notch traversing the body along its major axis and presenting an open-faced recess extending radially outward along the major axis; and a resilient jaw seated within the longitudinal notch in the body, said jaw presenting two opposing parallel arrays of resilient teeth, wherein the resilient teeth of the two opposing parallel arrays of resilient teeth are spaced apart by a recess, and the resilient teeth of the two opposing parallel arrays of resilient teeth are offset such that each tooth protrudes between two opposing teeth.

2. The apparatus of claim 1, wherein the resilient jaw is fabricated from silicone rubber.

3. The apparatus of claim 1, wherein the longitudinal notch has a width of ⅓ to ⅔ inches.

4. The apparatus of claim 1, wherein the longitudinal notch and the resilient jaw are each rectilinear on three sides, thereof such that the resilient jaw is configured to be press-fit into the longitudinal notch.

5. The apparatus of claim 1, wherein the resilient jaw is configured to fit over the spine of the knife blade.

6. A method of forming an apparatus for applying downward pressure to a spine of a knife blade, comprising:

press-fitting a resilient jaw within a longitudinal notch of an ovoid body, wherein said longitudinal notch traverses said ovoid body along its major axis, thereby presenting an open-faced recess extending radially outward along said major axis, said resilient jaw presenting two opposing parallel arrays of resilient teeth, wherein the resilient teeth of the two opposing parallel arrays of resilient teeth are spaced apart by a recess, and the resilient teeth of the two opposing parallel arrays of resilient teeth are offset such that each tooth protrudes between two opposing teeth.

7. The method of claim 6, wherein the resilient jaw is fabricated from silicone rubber.

8. The method of claim 6, wherein the longitudinal notch has a width of ⅓ to ⅔ inches.

9. The method of claim 6, wherein the longitudinal notch and the resilient jaw are each rectilinear on three sides thereof.

10. The method of claim 6, wherein the resilient jaw is configured to fit over the spine of the knife blade.

11. An apparatus for applying downward pressure to a spine of a knife blade, comprising:

a rigid body having an open-faced recess traversing said body; and a resilient member seated within and lining the open-faced recess of said body, said resilient member comprising opposing jaws configured for gripping a spine of the knife blade, wherein the resilient member has two opposing parallel arrays of resilient teeth that are spaced apart by a recess and the resilient teeth of each of the two opposing parallel arrays of resilient teeth are offset such that each tooth protrudes between two opposing teeth.

12. The apparatus for applying downward pressure to the spine of the knife blade according to claim 11, wherein said rigid body is ovoid.

13. The apparatus for applying downward pressure to the spine of the knife blade according to claim 11, wherein the opposing jaws are fabricated from silicone rubber.

14. The apparatus for applying downward pressure to the spine of the knife blade according to claim 11, wherein said open-faced recess of said body has a width of ⅓ to ⅔ inches.

* * * * *